United States Patent
Brownscombe

(10) Patent No.: US 10,327,389 B1
(45) Date of Patent: Jun. 25, 2019

(54) HANGING DRYING RACK

(71) Applicant: Jared Brownscombe, Upper Lake, CA (US)

(72) Inventor: Jared Brownscombe, Upper Lake, CA (US)

(*) Notice: Subject to any disclaimer, the term of this patent is extended or adjusted under 35 U.S.C. 154(b) by 0 days.

(21) Appl. No.: 15/952,318

(22) Filed: Apr. 13, 2018

Related U.S. Application Data

(60) Provisional application No. 62/487,207, filed on Apr. 19, 2017.

(51) Int. Cl.
| | | |
|---|---|---|
| A01F 25/12 | (2006.01) | |
| A47B 43/04 | (2006.01) | |
| A47B 43/00 | (2006.01) | |
| A24B 3/04 | (2006.01) | |
| A24B 1/08 | (2006.01) | |
| A01G 5/06 | (2006.01) | |
| B08B 17/00 | (2006.01) | |

(52) U.S. Cl.
CPC ............... *A01F 25/12* (2013.01); *A24B 1/08* (2013.01); *A24B 3/04* (2013.01); *A47B 43/003* (2013.01); *A47B 43/04* (2013.01); *A01G 5/06* (2013.01); *B08B 17/00* (2013.01)

(58) Field of Classification Search
CPC .. A01F 25/12; A24B 1/08; A24B 3/04; A47B 43/00; A47B 47/003; A47B 47/04; A47B 47/006; A47F 5/02; A01G 5/06; B08B 17/00
See application file for complete search history.

(56) References Cited

U.S. PATENT DOCUMENTS

| | | | | |
|---|---|---|---|---|
| 1,115,706 A | * | 11/1914 | Manuel ................ | B65D 9/12 217/44 |
| 1,206,618 A | * | 11/1916 | Thrasher ............. | B65D 7/26 220/6 |
| 1,540,024 A | * | 6/1925 | Larsen ................ | A47B 71/00 114/240 E |
| 1,691,904 A | * | 11/1928 | Gamble .............. | A45C 11/02 206/8 |
| D77,225 S | * | 12/1928 | Danz .................. | D6/514 |
| 1,730,898 A | * | 10/1929 | Percival .............. | A45C 11/02 206/278 |
| 1,749,497 A | * | 3/1930 | McGlashan ........ | A01K 39/014 119/531 |
| 2,071,290 A | * | 2/1937 | Scriba ................ | A47F 5/04 211/131.1 |
| 2,639,819 A | * | 5/1953 | Marks ................ | A47B 43/04 108/149 |

(Continued)

OTHER PUBLICATIONS

Curling Your Cannabis Crop. Article [online]. I Love Growing Marijuana [Retrieved on]. Retrieved from the Internet: <URL:http://www.ilovegrowingmarijuana.com/curing-cannabis/>.

*Primary Examiner* — Patrick D Hawn
(74) *Attorney, Agent, or Firm* — Cramer Patent & Design, PLLC; Aaron R. Cramer

(57) ABSTRACT

A hanging drying rack comprises a plurality of rectangular trays arrayed in a vertical column having a mesh bottom with a fastened section secured within each bottom. Lengths of cord secure the trays at each respective common corner. Each end of each cord is secured at a common point suprajacent the upper most tray. The drying rack is particularly suited for drying herbaceous material.

9 Claims, 4 Drawing Sheets

(56) References Cited

U.S. PATENT DOCUMENTS

| | | | | |
|---|---|---|---|---|
| 3,039,599 | A * | 6/1962 | Mintz | A47G 25/005 206/287 |
| 3,184,273 | A * | 5/1965 | Blough | A47B 61/04 206/292 |
| 3,452,880 | A * | 7/1969 | Kovacik | A47F 5/05 211/129.1 |
| 3,833,128 | A * | 9/1974 | Sumner | A47F 5/0031 211/131.1 |
| 3,904,258 | A * | 9/1975 | Faulkenberry | A47B 43/04 108/164 |
| 4,329,789 | A * | 5/1982 | Erickson | F26B 25/18 108/164 |
| 4,736,856 | A * | 4/1988 | Alneng | A47F 5/05 211/131.1 |
| 5,287,973 | A * | 2/1994 | Bankier | A01D 46/243 206/557 |
| 5,505,651 | A * | 4/1996 | Coughlin | A63H 3/50 108/149 |
| D392,133 | S * | 3/1998 | Chen | D6/513 |
| D418,287 | S * | 1/2000 | Moor | D3/201 |
| 6,126,021 | A * | 10/2000 | Wilhite | A47B 43/04 211/113 |
| 6,158,593 | A * | 12/2000 | Olsen | A63B 47/00 211/14 |
| 6,390,573 | B1 * | 5/2002 | Wang | A47B 61/00 108/149 |
| D461,638 | S * | 8/2002 | Kellogg | D3/304 |
| 6,502,707 | B1 * | 1/2003 | Sullivan | A47F 5/02 211/144 |
| 6,732,659 | B2 * | 5/2004 | Poon | A47B 47/0075 108/42 |
| 6,758,348 | B2 * | 7/2004 | Adkins | A47L 19/02 211/100 |
| 7,001,003 | B1 * | 2/2006 | Stone | A47F 3/005 312/249.2 |
| D557,538 | S * | 12/2007 | Kessler | D6/514 |
| 7,681,728 | B2 * | 3/2010 | Sabounjian | A45C 7/0077 206/278.1 |
| 7,789,250 | B2 * | 9/2010 | Aamodt | A63B 47/00 211/118 |
| D641,165 | S * | 7/2011 | Sabounjian | D3/313 |
| 8,459,473 | B2 * | 6/2013 | Wang | A47B 43/003 211/118 |
| 8,540,089 | B2 * | 9/2013 | Wang | A47B 43/003 211/118 |
| 8,919,578 | B2 * | 12/2014 | Villalobos | A47B 49/00 211/36 |
| 8,998,010 | B1 * | 4/2015 | Kennedy | A47B 47/0091 211/115 |
| 9,259,082 | B2 * | 2/2016 | Barre | A47B 43/003 |
| 9,999,299 | B2 * | 6/2018 | Neuwirth | A47B 43/04 |
| D822,995 | S * | 7/2018 | Whitley | B65D 21/0209 D3/301 |
| 2003/0230502 | A1 * | 12/2003 | Siegel | A47B 43/00 206/286 |
| 2005/0140253 | A1 * | 6/2005 | Fu | A47B 43/003 312/6 |
| 2007/0131683 | A1 * | 6/2007 | Sabounjian | A45C 7/0077 220/9.1 |
| 2009/0206711 | A1 * | 8/2009 | Glenn | A47B 43/003 312/108 |
| 2015/0189985 | A1 * | 7/2015 | Kennedy | A47B 47/0091 211/115 |

* cited by examiner

HANGING DRYING RACK

RELATED APPLICATIONS

The present invention was first described in and claims the benefit of U.S. Provisional Patent Application No. 62/487,207 filed on Apr. 19, 2017, the entire disclosures of which are incorporated herein by reference.

FIELD OF THE INVENTION

The present invention relates generally to the field of a suspended drying rack for herbaceous material.

BACKGROUND OF THE INVENTION

A drying rack is typically used to dry various flowers, plants, herbs, and smoking material on a small-scale basis for personal use. These multiple layer racks are arranged in a linear fashion with an air space between each to aid in rapid drying and are typically made of fabric mesh with a wire frame. Once the drying process is complete, the racks are disengage from one (1) another and the material inside transferred to a common container for further processing.

However, the material inside is brittle and fragile and is easily broken during the transferring process. Unfortunately, the material typically sticks to the mesh material and requires vigorous handling to transfer all material out, especially material that becomes trapped near the edges and corners of the tray. Accordingly, there exists a need for a means by which dried organic material can be easily removed from mesh style multiple layer drying racks. The development of the multi-level drying rack fulfills this need.

SUMMARY OF THE INVENTION

To achieve the above and other objectives, the present invention provides for such a suspended drying rack including a plurality of trays, each comprising two (2) structural support rings, a plurality of side panels affixed between the structural support rings, and a bottom panel affixed to a lower one (1) of said structural support rings, and a plurality of vertical members, each attached to each of the plurality of trays and each having a first end terminating in a common hook capable of being suspended to support the drying rack. Each bottom panel has a bifurcated portion, removably secured to a remainder of the bottom panel with a fastener. In at least one (1) embodiment, the bifurcated portion is capable of separating and being suspended from the remainder of the bottom panel It is therefore an object of the invention to provide a plurality of clips, each removably connecting each tray to an individual hanging member.

It is also an object of the invention to provide that a bottom panel of each tray includes a hanging flap removably connected thereto.

It is another object of the present invention to provide that the structural support rings are fabricated out of steel wire.

It is another object of the present invention to provide that the plurality of side panels and bottom panel are mesh material.

It is yet another object of the present invention to provide that the mesh material is one (1) of the following: mosquito netting, cargo netting, and nylon tulle.

It is yet another object of the present invention to provide that the fastener encircles approximately eighty-five percent (85%) of said bottom panel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
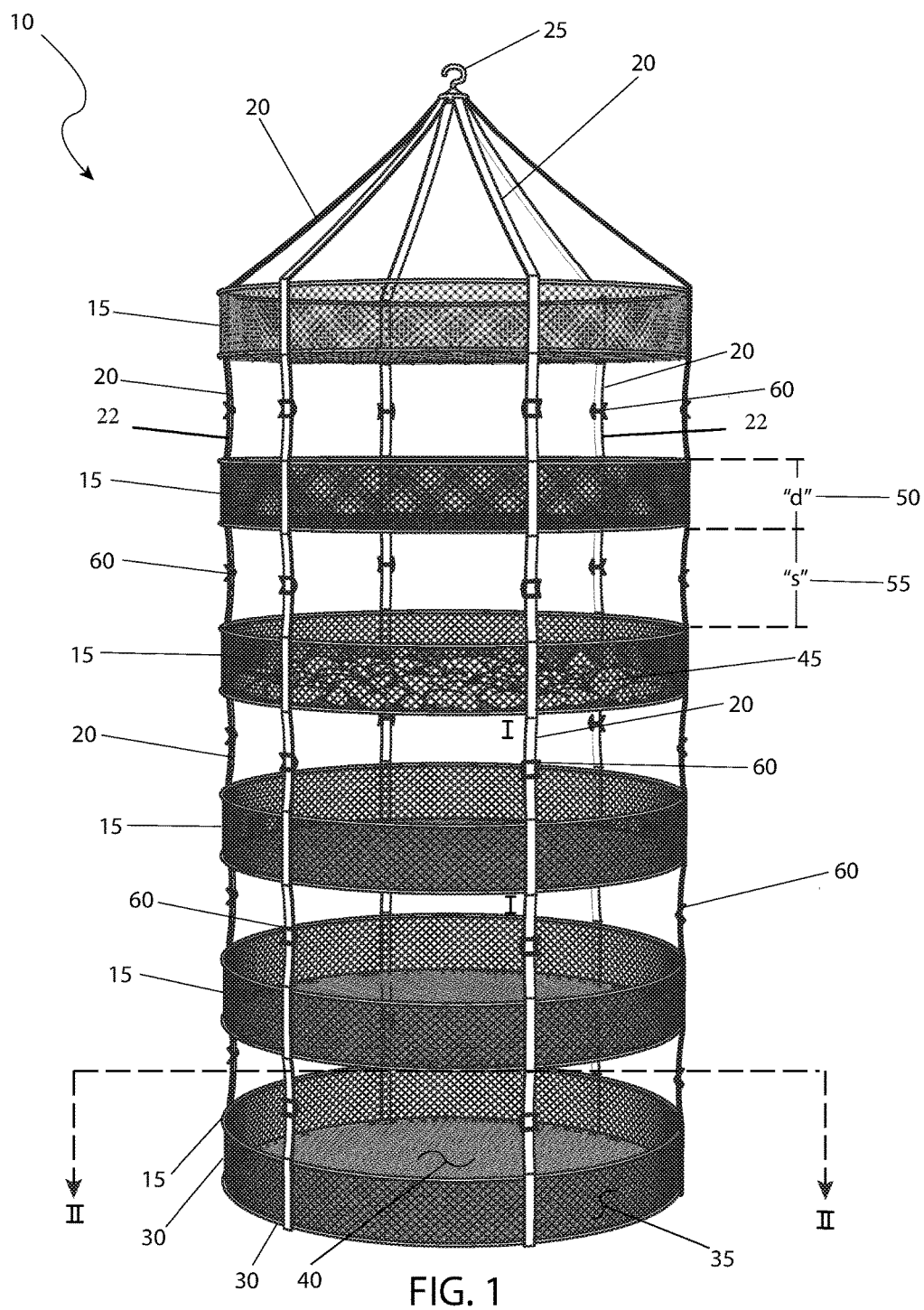
FIG. 1 is a perspective view of the multi-level drying rack 10, according to the preferred embodiment of the present invention.

DESCRIPTIVE KEY 10 multi-level drying rack
15 tray
20 vertical member
25 support hook
30 structural support ring
35 mesh fabric side
40 mesh fabric bottom
45 organic material
50 depth dimension "d"
55 space dimension "s"
60 connecting clip
65 zipper
70 zipper pull
75 zipper stop
80 hanging flap embodiment
85 container

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a perspective view of the multi-level drying rack 10, according to the preferred embodiment of the present invention, is disclosed. The multi-level drying rack 10 (herein described as the "apparatus") 10, includes multiple trays 15, supported by vertical members 20, terminating in a common support hook 25.

Each tray comprises two (2) structural support rings 30 envisioned to be made of steel wire, with mesh fabric sides 35 and a mesh fabric bottom 40. The mesh fabric sides 35 and mesh fabric bottom 40 work in conjunction with the open top of each trays 15 to allow air flow on all sides to assist in the drying of the organic material 45 (shown only in one (1) tray 15 for purposes of illustration) placed inside of each tray. Air flow may be enhanced by placement of the apparatus 10 near an open window, air discharge device, or a mechanical enhancement such as a fan. The organic material 45 is envisioned to include various flowers, plants, herbs, and smoking material such as tobacco or marijuana. Each mesh fabric side 35 is envisioned to be approximately six inches (6 in.) in depth as denoted by a depth dimension "d" 50. Each tray 15 is envisioned to be separated by approximately eighteen inches (18 in.) as denoted by a space dimension "s" 55. Each tray 15 is provided with a connecting clip 60 in its respective vertical member 20 to allow for disengagement of each tray 15 from the apparatus 10. It is envisioned that the uppermost trays 15 would be loaded with organic material 45 first. Then each successive lower tray 15 would be loaded with organic material 45 and attached to the previous trays 15 with use of the connecting clip 60 until all trays 15 are loaded and hanging as disclosed. The number of trays 15 utilized is not intended to be a limiting factor of the present invention. The vertical member 20 may be an elongated solid band 22 for ease and cost efficiency of production.

Figure 2:
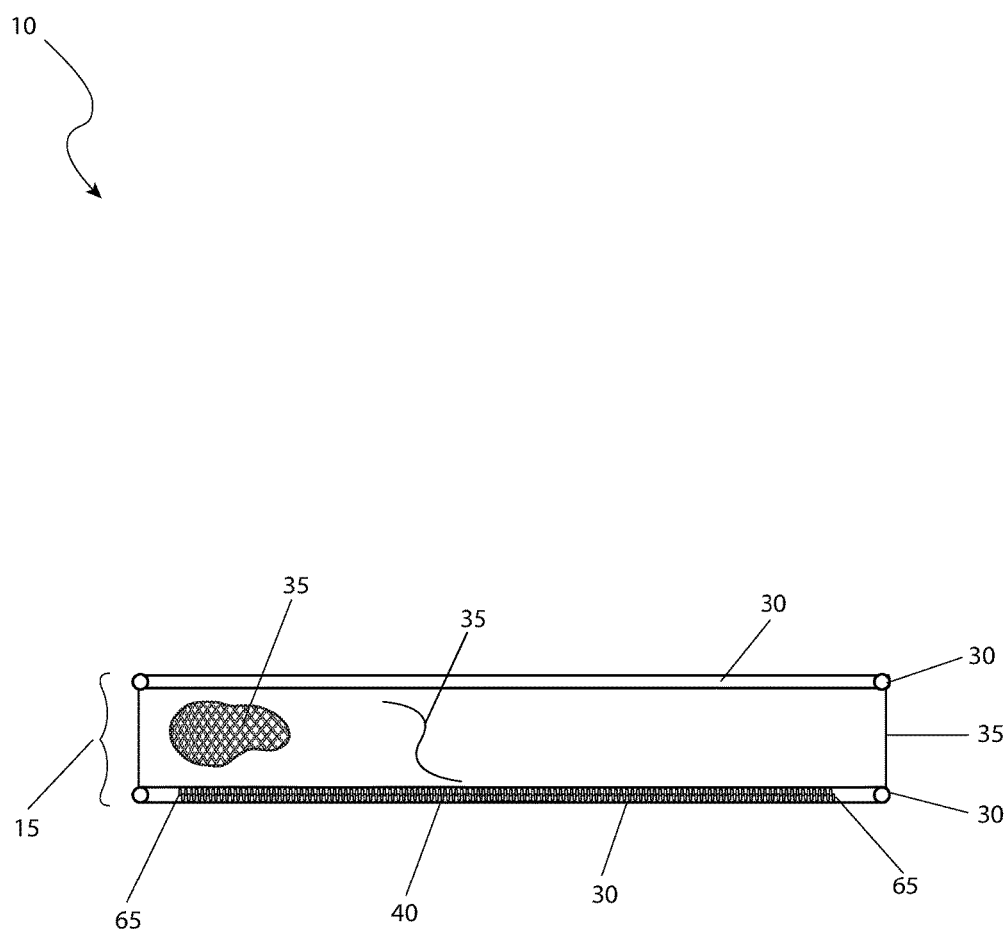
FIG. 2 is a sectional view of the multi-level drying rack 10 as seen along a line I-I, as shown in FIG. 1, according to the preferred embodiment of the present invention.

Referring next to FIG. 2, a sectional view of the apparatus 10 as seen along a line I-I, as shown in FIG. 1, according to the preferred embodiment of the present invention is depicted. This figure clearly discloses the mesh fabric sides 35 and mesh fabric bottom 40 as suspended between the upper structural support rings 30 and lower structural support rings 30. This suspension is envisioned to be accomplished by mechanical fastening such as sewing, adhesive bonding or the like. Other embodiments can include where the mesh fabric sides 35 and mesh fabric bottom 40 can be suspended between the upper and lower structural support rings 30 by removal connection, such as by straps, snaps, hook-and-loop-type fasteners, or other similar removable fasteners. The mesh fabric sides 35 and mesh fabric bottom 40 is envisioned to be a fine mesh fabric such as mosquito netting, utility fabric cargo netting, nylon tulle, or the like. The mesh fabric bottom 40 is provided with a zipper 65 that circle the majority of the perimeter of the bottom surface. Further description of the zipper 65 will be provided herein below.

Figure 3:
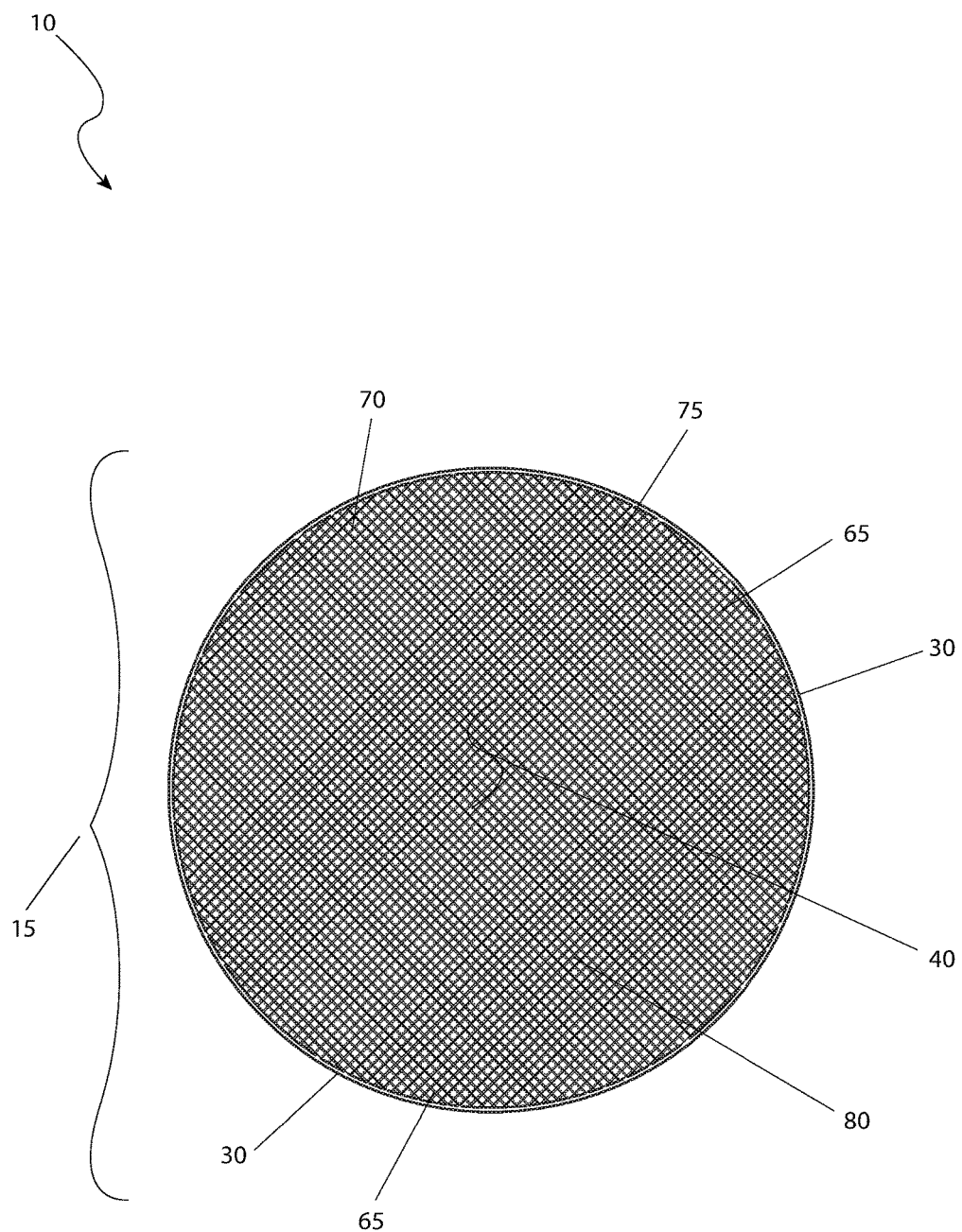
FIG. 3 is a sectional view of the multi-level drying rack 10 as seen along a line II-II, as shown in FIG. 1, according to the preferred embodiment of the present invention; and, FIG. 4 is a perspective view of the multi-level drying rack 10 shown in a utilized state with a container 85, according to the preferred embodiment of the present invention.

Referring now to FIG. 3, a sectional view of the apparatus 10 as seen along a line II-II, as shown in FIG. 1, according to the preferred embodiment of the present invention is shown. This figure clearly shows the continuous and circular nature of the zipper 65. The zipper 65 is provided with a zipper pull 70 and a zipper stop 75 as is customarily expected. The zipper 65 is located approximately one-half inch (½ in.) inward from the structural support rings 30 and encircles approximately eighty-five percent (85%) of the perimeter of each trays 15. With the zipper 65 in the closed position (as shown) the mesh fabric bottom 40 provides a taut bottom surface suitable for holding the organic material 45 (as shown in FIG. 1). With the zipper 65 in the fully or even partially open position, distal edges of the mesh fabric bottom 40 becomes a hanging flap embodiment 80 allowing for all organic material 45 to easily fall from the bottom of the trays 15 with minimal contact and damage.

Figure 4:
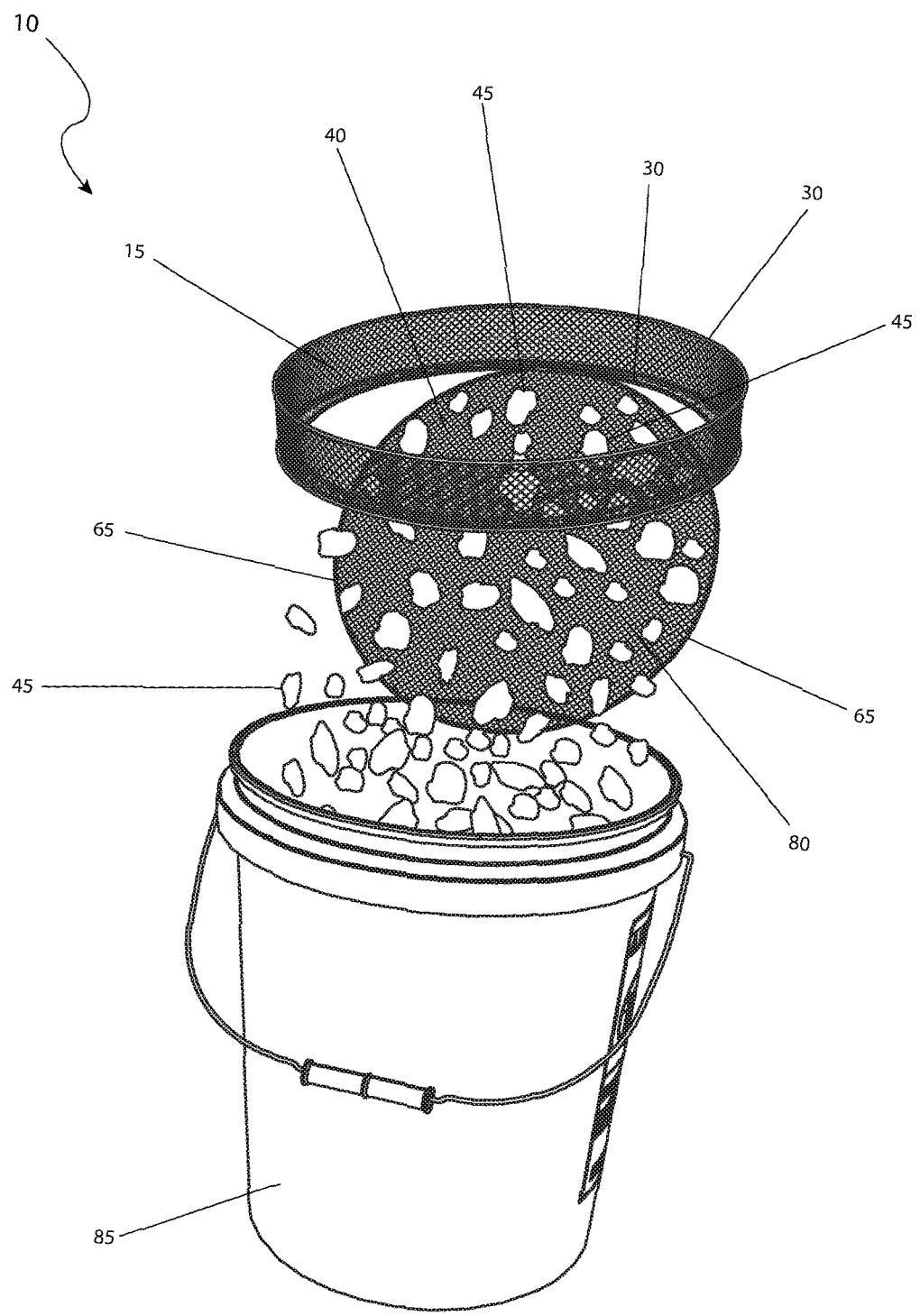

Referring finally to FIG. 4, a perspective view of the apparatus 10 shown in a utilized state with a container 85, according to the preferred embodiment of the present invention is disclosed. The container 85 is depicted as a five gallon (5 Gal) pail for purposes of illustration. However, the apparatus 10 can be used with nearly any style of container 85, and as such, the particular use of any style of container 85 is not intended to be a limiting factor of the present invention. The trays 15, as previously separated from the apparatus 10, as described in FIG. 1, is positioned over the container 85 and is supported by the upper structural support rings 30 and lower structural support rings 30. The user then opens the zipper 65 so as to transform the mesh fabric bottom 40 into a hanging flap embodiment 80 as shown. It should be noted that the zipper 65 is only opened as far as necessary to allow the organic material 45 to fall into the container 85. It is also envisioned that the opening of the zipper 65 would be accomplished in an incremental manner, with a slight opening of the zipper 65 occurring initially, and then, as organic material 45 falls out, additional opening could occur to ensure that all removal of the organic material 45 happens in a controlled manner with reduced chance for spilling and the associated physical damage to the organic material 45 that could occur during rough or vigorous handling. Once all organic material 45 has been removed from the trays 15, the zipper 65 is reclosed allowing for reuse in a continuous manner.

The preferred embodiment of the present invention can be utilized by the common user in a simple and effortless manner with little or no training. It is envisioned that the apparatus 10 would be constructed in general accordance with FIG. 1 through FIG. 4.

After procurement or construction of the apparatus 10, it is assembled as generally shown in FIG. 1. Organic material 45 is loaded into the uppermost trays 15 and the support hook 25 is connected to a suitable support location such as a ceiling-mounted hook. Each subsequent tray 15 is then filled with container organic material 45 and connected to the preceding trays 15 by use of the connecting clip 60. Filling and assembly by connection then continues until the organic material 45 is exhausted or all trays 15 are filled. A suitable period of time then expires to allow the organic material 45 to dry out. Such drying may be assisted by placement of the apparatus 10 near an open window, air discharge device, or a mechanical enhancement such as a fan.

After drying of the organic material 45 is complete, the user would remove the lowermost trays 15 first by use once again of the connecting clip 60. The trays 15 is then positioned over a container 85 and is supported by the upper structural support rings 30 and lower structural support rings 30. The user then opens the zipper 65 so as to transform the mesh fabric bottom 40 into a hanging flap embodiment 80 as shown. It should be noted that the zipper 65 is only opened as far as necessary to allow the organic material 45 to fall into the container 85. It is also envisioned that the opening of the zipper 65 would be accomplished in an incremental manner, with a slight opening of the zipper 65 occurring initially, and then, as organic material 45 falls out, additional opening could occur to ensure that all removal of the organic material 45 happens in a controlled manner with reduced chance for spilling and the associated physical damage to the organic material 45 that could occur during rough or vigorous handling. Once all organic material 45 has been removed from the trays 15, the zipper 65 is reclosed.

At this point in time, the apparatus 10 is ready for re-use and may be refilled again with new organic material 45 in a manner previously described thus allowing for continuous re-use in a cyclical manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A drying rack, comprising:
a plurality of trays each having two structural support rings, a side panel affixed between said structural support rings, and a bottom panel affixed to a lower one of said structural support rings; and,
a plurality of elongated vertical bands each attached to each of said plurality of trays, each tray having a plurality of clips each removably connecting to each said elongated vertical band and each having a first end terminating in a common hook capable of being suspended to support said drying rack;
wherein material is capable of being supported on each tray; and,
wherein each bottom panel has a bifurcated portion removably secured to a remainder of said bottom panel with a fastener;
wherein said bifurcated portion is capable of separating and being suspended from said remainder of said bottom panel;
wherein said side panels and said bottom panel are mesh material, wherein said mesh material is mosquito netting or nylon tulle.

2. The drying rack of claim 1, wherein said structural support rings are fabricated out of steel wire.

3. The drying rack of claim 1, wherein said fastener encircles 85% of said bottom panel.

4. The drying rack of claim 1, wherein said fastener encircles 85% of said bottom panel.

5. A drying rack, comprising:
a plurality of trays each having two structural support rings, a side panel removably affixed between said structural support rings, and a bottom panel removably affixed to a lower one of said structural support rings; and,
a plurality of elongated vertical bands each attached to each of said plurality of trays, each tray having a plurality of clips each removably connecting to each said elongated vertical band and each having a first end terminating in a common hook capable of being suspended to support said drying rack;
wherein material is capable of being supported on each tray; and,
wherein each bottom panel has a bifurcated portion, removably secured to a remainder of said bottom panel with a fastener;
wherein said bifurcated portion is capable of separating and being suspended from said remainder of said bottom panel;
wherein said side panels and said bottom panel are mesh material, wherein said mesh material is mosquito netting or nylon tulle.

6. The drying rack of claim 5, wherein said structural support rings are fabricated out of steel wire.

7. The drying rack of claim 5, wherein said fastener encircles 85% of said bottom panel.

8. The drying rack of claim 5, wherein said mesh material is selected from the group consisting of mosquito netting, cargo netting, or nylon tulle.

9. The drying rack of claim 8, wherein said fastener encircles 85% of said bottom panel.

* * * * *